United States Patent
Upadhyay et al.

(10) Patent No.: US 8,713,093 B1
(45) Date of Patent: Apr. 29, 2014

(54) SELECTING CONTENT FOR STORAGE IN A MULTI-DEVICE CACHE

(75) Inventors: Piyush Upadhyay, Overland Park, KS (US); Badri Prasad Subramanyan, Overland Park, KS (US); Shilpa Srinivas Kowdley, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1268 days.

(21) Appl. No.: 12/431,931

(22) Filed: Apr. 29, 2009

(51) Int. Cl.
*G06F 15/16* (2006.01)

(52) U.S. Cl.
USPC ............................ 709/203; 709/217; 709/246

(58) Field of Classification Search
USPC ......................................... 709/203, 217, 246
See application file for complete search history.

(56) References Cited

U.S. PATENT DOCUMENTS 7,249,197 B1 * 7/2007 Roestenburg et al. ........ 709/246
7,318,086 B2 * 1/2008 Chang et al. .................. 709/217

OTHER PUBLICATIONS

Sprint Spectrum L.P., U.S. Appl. No. 10/978,772, filed Nov. 1, 2004, Inventors: Balaji S. Thenthiruperai, Kevin Hunter, and Scott Papineau, Method and System for Dynamically Updating Fixed Resources on a Client Station, 57 pages.
Sprint Communications Company L.P., U.S. Appl. No. 12/365,170, filed Feb. 3, 2009, Inventors: Robin Katzer, Sei Ng, and M. Jeffrey Stone, Parallel Management of Load Servers, Cache Servers and Feed Servers, 32 pages.

* cited by examiner

*Primary Examiner* — Adnan Mirza

(57) ABSTRACT

A method, system, and computer-readable media having computer-executable instructions for managing caches on a gateway are provided. Content received in response to requests for media objects, such as web pages and pictures, are stored on a gateway in either a device-specific cache or a multi-device cache. Objects that are generic are stored in the multi-device cache. A generic object is an object that may be requested by all devices visiting a web page. A device-specific object is tailored to a particular device and may not be requested by multiple devices. Embodiments of the present invention may determine that a particular object is a generic object when a request for it is received from more than one mobile device. The object determined to be generic may then be stored in a multi-device cache.

10 Claims, 5 Drawing Sheets

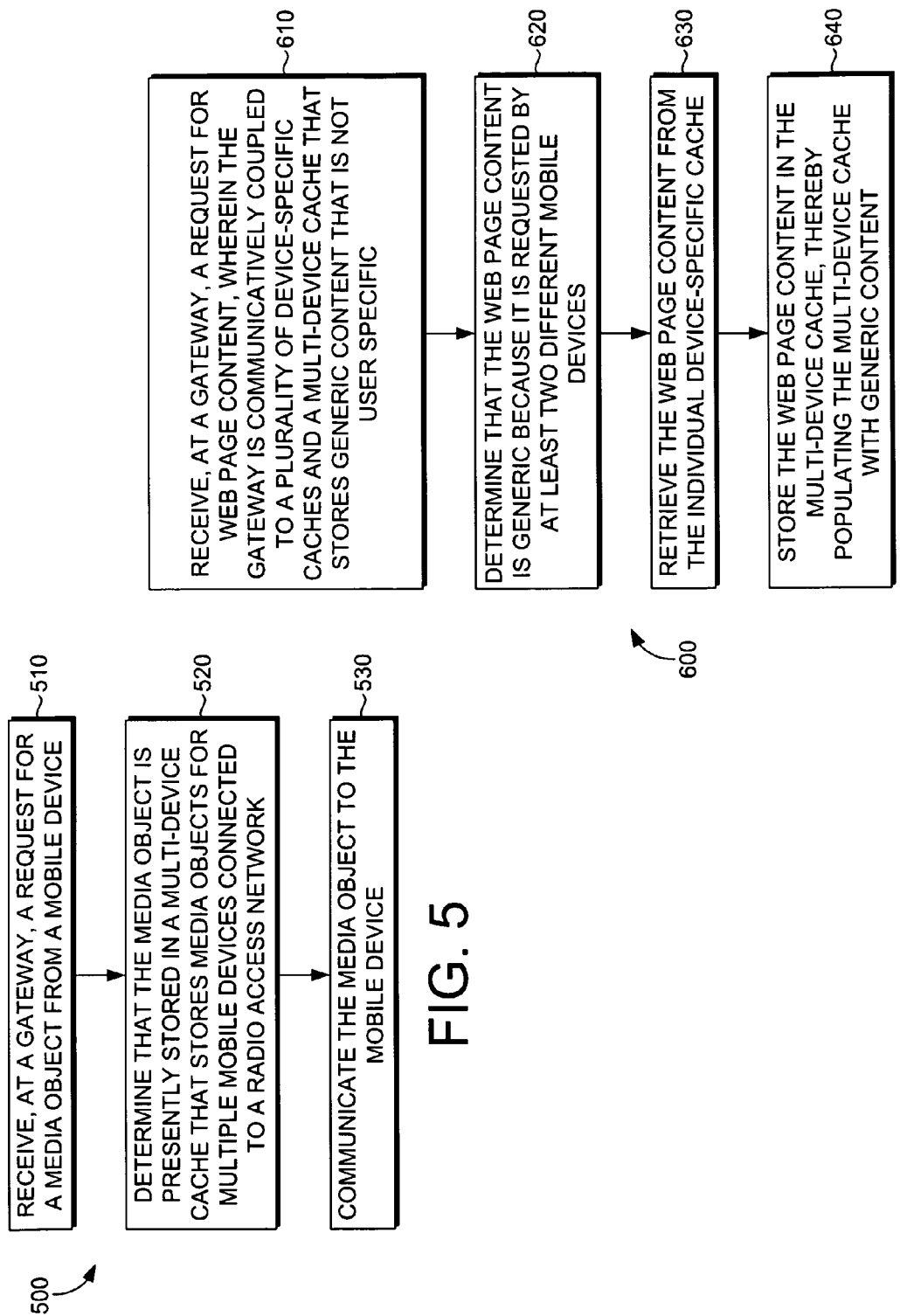

US 8,713,093 B1

SELECTING CONTENT FOR STORAGE IN A MULTI-DEVICE CACHE

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, a computer-readable media having computer-executable instructions embodied thereon that, when executed, perform a method of selecting content for storage in a multi-device cache that is accessible by a gateway to provide content to multiple mobile devices is provided. The method includes receiving, at the gateway, a request for the content, wherein the request is received from a mobile device. The method also includes determining that the content is not presently stored in a device-specific cache associated with the mobile device or the multi-device cache associated with the multiple mobile devices and communicating the request of the content to a content server associated with the content. The method further includes receiving, at the gateway, a response from the content server that includes the content and storing a copy of the content in the device-specific cache. The method further includes receiving, at the gateway, an additional request for the content from a different mobile device. The method also includes determining that the content is not device-specific because the content was requested by two different mobile devices and storing the copy of the content in the multi-device cache, thereby storing a single copy of the content that can be communicated to the multiple mobile devices that request the content from the gateway.

In another illustrative embodiment, a computer-readable media having computer-executable instructions embodied thereon that, when executed, perform a method of retrieving requested content from a multi-device cache is provided. The method includes receiving, at a gateway, a request for a media object from a mobile device. The gateway is an interface between a radio access network to which the mobile device is connected and a network to which one or more content providers are connected. The method also includes determining that the media object is presently stored in the multi-device cache that stores media objects for multiple mobile devices connected to the radio access network. The method further includes communicating the media object to the mobile device.

In a third illustrative embodiment, a computer-readable media having computer-executable instructions embodied thereon that, when executed, perform a method of distributing web page content between a plurality of device-based caches and a multi-device cache is provided. The method includes receiving, at a gateway, a request for web page content. The gateway is communicatively coupled to a plurality of device-specific caches used to store content associated with specific mobile devices and the multi-device cache that stores generic content that is not device specific. The method also includes determining that the web page content is generic because it is requested by at least two different mobile devices. The method further includes retrieving the web page content from an individual device-specific cache. The method also includes storing the web page content in the multi-device cache, thereby populating the multi-device cache with the generic content.

BRIEF DESCRIPTION OF THE SEVERAL VIEWS OF THE DRAWINGS

Illustrative embodiments of the present invention are described in detail below with reference to the included drawing figures, wherein:

FIG. 5 is a flowchart showing a method of retrieving requested content from a multi-device cache is provided, in accordance with the embodiment of the present invention; and FIG. 6 a flowchart showing a method of distributing content between a plurality of device-based caches and a multi-device cache, in accordance to an embodiment of the present invention.

DETAILED DESCRIPTION

Figure 1:
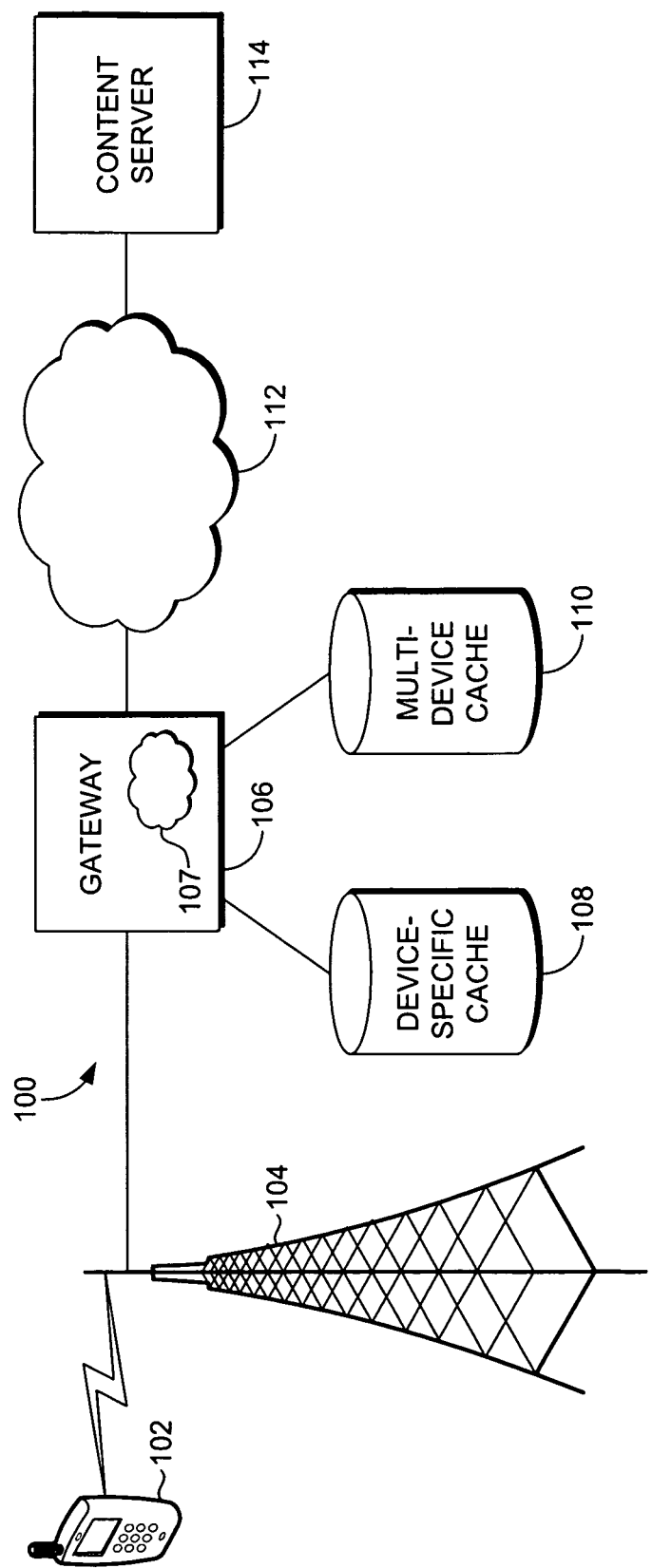
FIG. 1 is a block diagram of an illustrative environment in which an embodiment of the present invention may operate.

Embodiments of the present invention provide a system and method for storing media objects in a multi-device cache that is accessible by a group of mobile devices. Media objects received by a gateway in response to requests for media objects, such as web pages and pictures, are stored on the gateway in either a device-specific cache or a multi-device cache. Objects that are generic are stored in the multi-device cache. A generic object is an object that may be requested by all devices visiting a web page. A device-specific object is tailored to a particular device, or users of the device, and may not be requested by multiple devices. Embodiments of the present invention may determine that a particular object is a generic object when a request for it is received for more than one mobile device. The object determined to be generic may then be stored in a multi-device cache.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile-communications |
| LAN | Local Access Network |

-continued

| | |
|---|---|
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes a mobile device 102, a base station 104, a gateway 106, a cache-management component 107, a multi-device cache 110, a device-specific cache 108, a network 112, and a content server 114. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of accessing content over the Internet. Examples of content that may be received include text messages, multimedia messages, emails, calendar updates, web pages, videos, pictures, and task reminders.

The mobile device 102 may be associated with a user. For example, a text message sent to mobile device 102 would be intended for the user of the device. The user is the ultimate recipient of communications (e.g., emails, phone calls, text messages) and media content sent to mobile device 102. At points within this description, a user may be described as receiving a communication. It should be understood that the user receives the communication through their mobile device.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communication interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Gateway 106 provides a boundary between radio communication functions embodied in one or more radio-access systems that form the access-facing portion of illustrative operating environment 100 and the standard Internet protocol ("IP") communication functions (including Mobile IP) embodied in the public-network facing portion (e.g., network 112) of illustrative operating environment 100. Access gateway 106 might be, for example, an ASN-GW, a PDSN, a SGSN/GGSN, and the like. The gateway 106 includes a computing device that may include a CPU, short-term memory, long-term memory, and one or more network interfaces. The network interfaces are used to communicate data between the network 112 and devices, such as mobile device 102, connected to the access-facing portion of illustrative operating environment 100. A network interface to the WAN or LAN could be wired, wireless, or both. In one embodiment, the gateway 106 receives requests from mobile devices connected to the radio-access network associated with the gateway 106. The gateway 106 may modify the request to include authentication information and address information for the gateway 106 and forward the request to a content server, such as content server 114. In one embodiment, the request is an HTTP request. The gateway 106 may modify the HTTP request by adding address information for the gateway to the HTTP request header.

The cache-management component 107 manages content in a plurality of user-specific caches and a multi-device cache 110. The device-specific cache 108 is one example of a cache within the plurality of user-specific caches that may be communicatively coupled to the gateway 106. As described in more detail subsequently, the device-specific cache 108 stores content for a single mobile device communicating through the gateway 106. The multi-device cache 110 stores content for multiple devices communicating through the gateway 106. The cache-management component 107 determines when content should be placed in the multi-device cache 110, rather than the device-specific cache 108. In one embodiment, a particular content is placed in the multi-device cache 110 when a request for the particular content is received from two or more mobile devices.

Cache-management component 107 may also prevent duplicate copies of content from being stored in more than one cache. In one embodiment, the cache-management component 107 deletes content from a device-specific cache upon storing the content in the multi-device cache 110. Duplicate copies of content may be detected by evaluating a content log that tracks all of the content received by the gateway. The content may be identified by name or a URL from which the content was retrieved. Other ways of identifying the content are also possible. Upon receiving a request for content that has been received previously and is presently stored in a device-specific cache, the cache-management component 107 may retrieve the content from the device-specific cache and store it in the multi-device cache 110.

The device-specific cache 108 stores content requested by a single mobile device. The mobile devices connected to the gateway 106 may not have their own local caches on the mobile device for content retrieved while browsing the Internet. The gateway 106 caches content during the browsing session in device-specific caches for the mobile devices that do not have their own local cache. The device-specific cache 108 may store content retrieved during a web-browsing session. The content may be stored in the device-specific cache 108 for the duration of a web-browsing session so that the same content does not need to be requested multiple times from a content server. In one embodiment, the device-specific cache 108 is established when a communication session is initiated for a particular mobile device. The content in the device-specific cache 108 may be deleted when the browsing session or communication session with the mobile device is terminated. A browsing session may be a series of requests and responses sent between the mobile device and a one or more content provider during a threshold period of time. The communication session may be determined to have terminated after no requests are received after a threshold period of time. The device-specific cache 108 may be stored in the gateway's 106 RAM, long-term memory, or on computer memory that is part of a separate computing device. The device-specific cache 108 may be matched with a particular mobile device through a unique identifier assigned to the mobile device. For example, each mobile device may be assigned a network access identifier ("NAI") that is used to match the device-specific cache 108 with the mobile device.

The multi-device cache 110 stores content received by the gateway 106. The content may have been requested by one or more mobile devices, such as mobile device 102, communicating with content providers through the gateway 106. The multi-device cache 110 stores content that is generic. Generic content is provided by content providers to multiple users that request the content. For example, the pictures and news articles on a sports website may be sent to all users that request the website. In contrast, certain aspects of personalized websites may be user specific and only be sent to a particular user. An example of a user-specific content is a picture of an item viewed on a shopping web page. While this item may actually be viewed by more than one user, it is not likely to be frequently viewed by multiple users or requested by multiple users within the period of time during which content is likely to remain in a cache. The multi-device cache 110 may reduce the storage needs for a gateway cache because the storage of redundant copies of content requested by multiple users is reduced. In addition, the multi-device cache 110 may reduce the bandwidth usage by reducing the need for the gateway 106 to retrieve the same content multiple times.

Network 112 may include one or more mobile networks, one or more packet-based networks, including the Internet, and the public-switched telephone network ("PSTN"). The various components within network 112 may be owned and/or operated by multiple entities, commercial or otherwise. Network 112 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The content server 114 stores media content and communicates it to a device upon receiving a request for the media. The content server 114 includes a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the content server 114 facilitates transmission of media content (e.g. movies, web pages, videos, MP3s, etc.) to mobile device 102. The content server 114 transmits the media content over the packet-switched network 112. The content server 114 may also host web pages that are transmitted to a requesting device. Content server 114 may be affiliated with a content provider that produces, generates, or maintains the media content on the content server 114.

Figure 2:
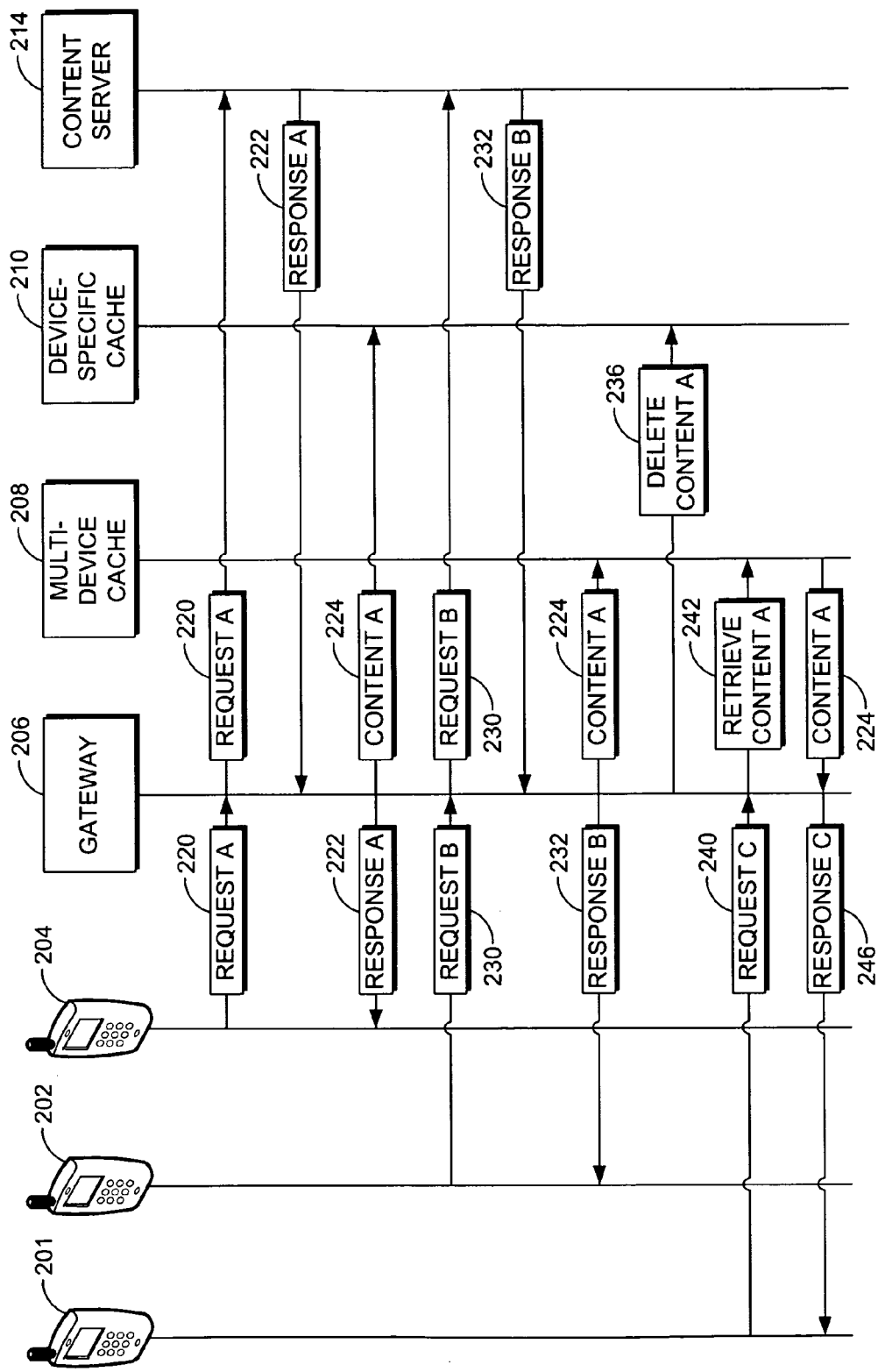
FIG. 2 is a diagram showing communications occurring while determining whether to cache web content in a device-specific cache or a multi-device cache, in accordance with an embodiment of the present invention.

Turning now to FIG. 2, a diagram showing communications occurring while determining whether to cache web content in a device-specific cache or a multi-device cache is provided, in accordance with an embodiment of the present invention. The mobile devices 201, 202, and 204 may be similar to the mobile device 102 described previously with reference to FIG. 1. The gateway 206 may be similar to the gateway 106 described previously with reference to FIG. 1. The multi-device cache 208 may be similar to the multi-device cache 110 described previously with reference to FIG. 1. The device-specific cache 210 may be similar to the device-specific cache 108 described previously with reference to FIG. 1. The content server 214 may be similar to the content server 114 described previously with reference to FIG. 1.

Initially, mobile device 204 sends request A 220 to the gateway 206. In one embodiment, the request A 220 is an HTTP Get request. Request A 220 identifies a content that is being requested. The content may be identified by a URL from which the content may be retrieved. Upon receiving request A 220, the gateway 206 determines that the content requested by request A 220 is not stored within the multi-device cache 208 or the device-specific cache 210 associated with the mobile device 204. Upon determining that the requested content is not within a cache, the gateway 206 communicates request A 220 to a content server 214 that has the requested content. In response to receiving request A 220, the content server 214 sends response A 222 back to the gateway 206. In one embodiment, the response A 222 includes the requested content. Upon receiving response A 222, the gateway 206 forwards response A 222 to the mobile device 204, which had requested the content. In addition to forwarding response A 222 to the mobile device 204, the gateway 206 stores the content A 224 in the device-specific cache 210 associated with the mobile device 204. Content A 224 is stored in a device-specific cache 210 because this is the first time the gateway 206 has received content A 224.

Continuing with FIG. 2, the mobile device 202 sends request B 230 to the gateway 206. Request B 230 also identifies content A 224 as the requested content. The gateway 206 recognizes that it has previously received and stored content A 224 in the device-specific cache 210. The gateway 206 retrieves content A from the device-specific cache 210 and sends content A 224 to the mobile device 202 within response B 232. Content A 224 is also sent to, and stored in, the multi-device cache 208. In one embodiment, the gateway 206 sends instruction to delete content A 236 to the device-specific cache 210. The contents of one or more device-specific caches and the multi-device cache 208 may be logged in an index by the gateway 206 to determine when the content is requested for a second time.

Continuing with FIG. 2, request C 240 is sent from mobile device 201 to the gateway 206. The request C 240 also requests content A 224. The gateway 206 retrieves content A 224 from the multi-device cache 208. The gateway 206 then sends response C 246 to the mobile device 201. The response C 246 includes the content A 224.

Figure 3:
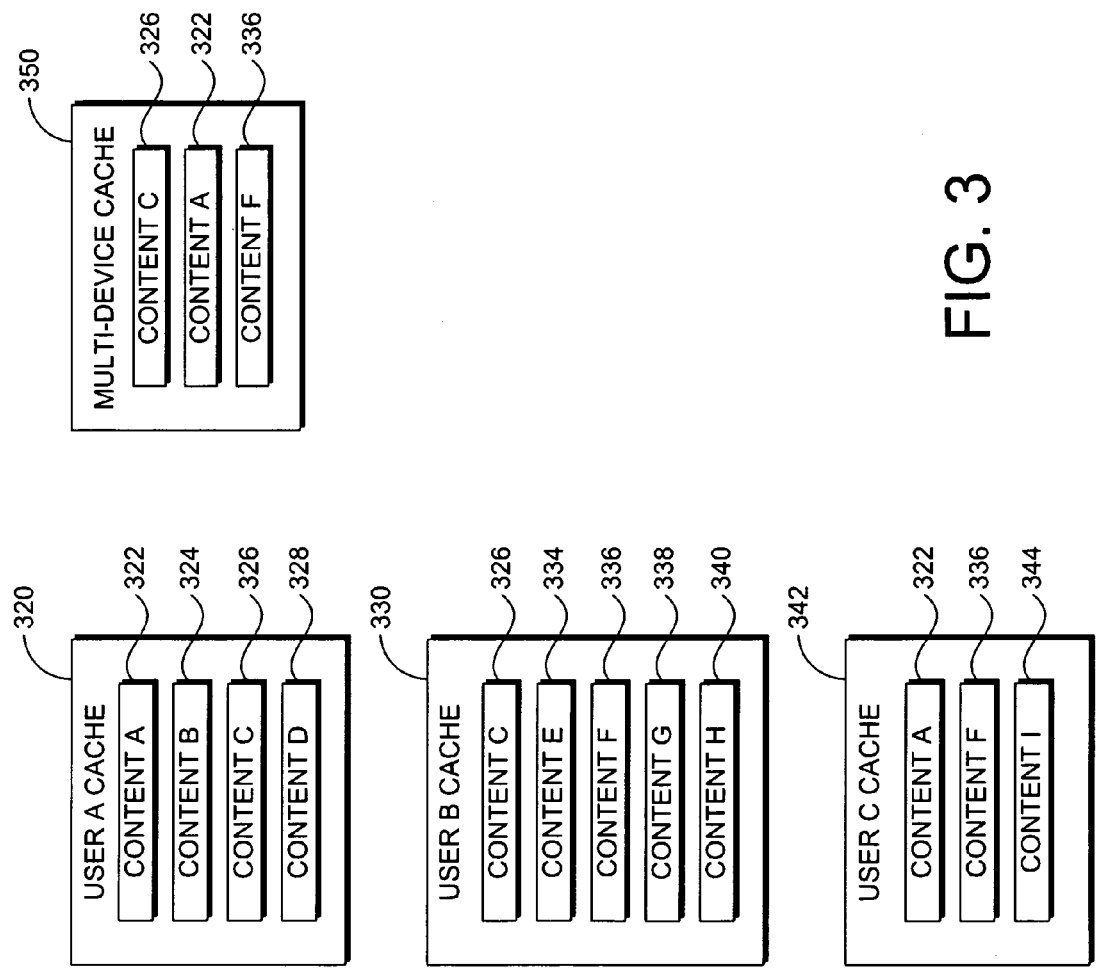
FIG. 3 is a diagram showing the transfer of content from device-specific caches to a multi-device cache, in accordance with an embodiment of the present invention.

Turning now to FIG. 3, a diagram showing the transfer of content from device-specific caches to a multi-device cache is provided, in accordance with an embodiment of the present invention. When multiple copies of content are stored in device-specific caches, a copy of the content may be moved into a multi-device cache. Once the content is stored in a multi-device cache, a process may be activated to prevent additional copies of the content from being stored in device-specific caches. Device A cache 320, device B cache 330 and device C cache 342 are all device-specific caches. The device A cache 320 includes "content A" 322, "content B" 324, "content C" 326, and "content D" 328. The content may be a web page, video, picture, advertisement, or other media object. The device B cache 330 includes "content C" 326, "content E" 334, "content F" 336, "content G" 338, and "content H" 340. The device C cache 342 includes "content A" 322, "content F" 336, and "content I" 344.

The multi-device cache 350 includes content that is stored in more than one device-specific cache. Specifically, the multi-device cache 350 includes "content C" 326, which is in both device A cache 320 and device B cache 330. The multi-device cache 350 also includes "content A" 322, which is found in device A cache 320 and device C cache 342. The multi-device cache 350 also includes "content F" 336, which is found in device B cache 330 and device C cache 342. Thus, in one embodiment of the present invention, the multi-device cache is populated with content that has been requested by two or more mobile devices. As described previously, the content does not need to actually be stored in two device-specific caches before the content is moved to the multi-device cache. It is enough to request the same content twice. The content may be identified as a duplicate by the URL associated with the content or other unique identifier.

Figure 4:
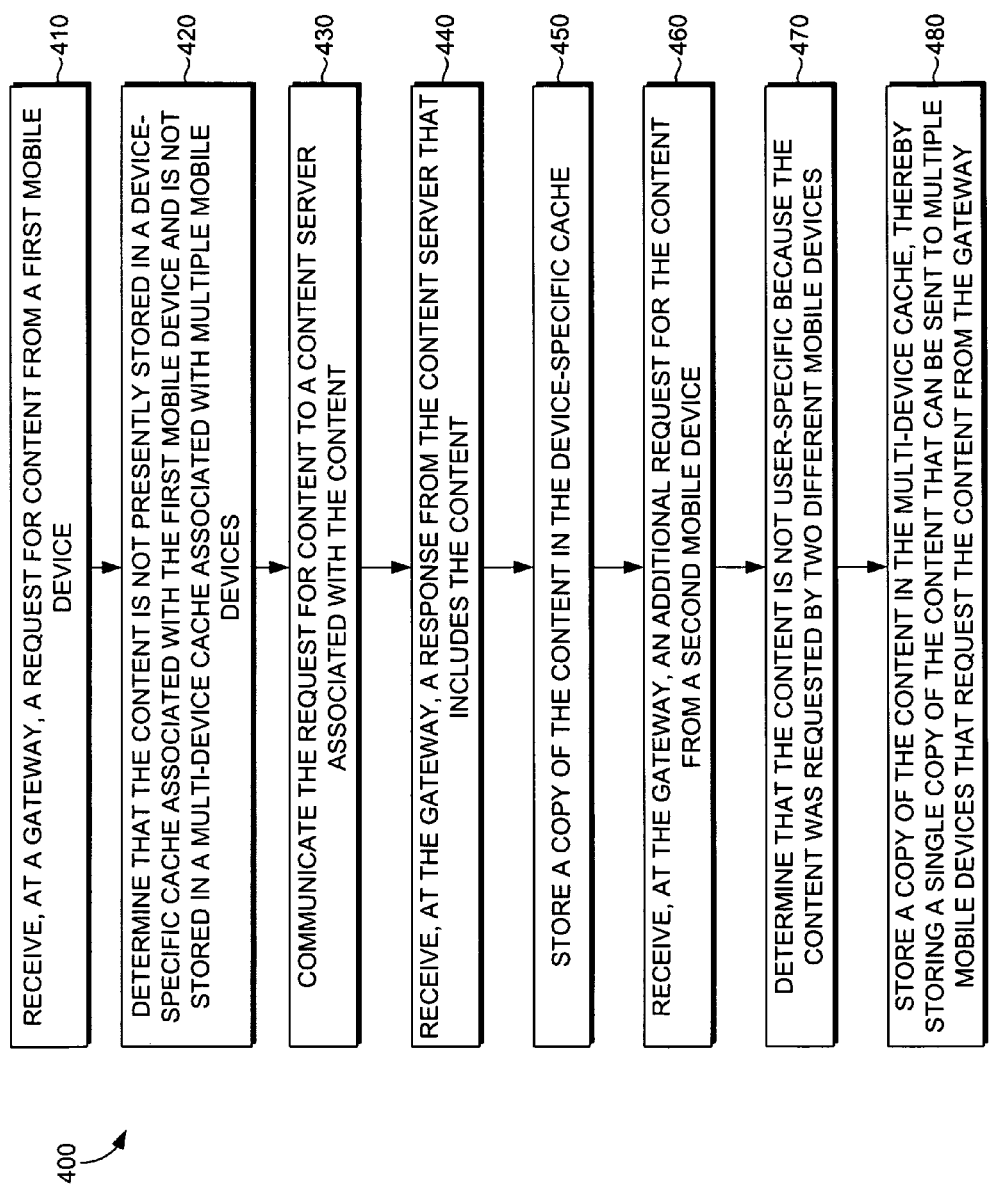
FIG. 4 is a flowchart showing a method of selecting content for storage in a multi-device cache that is accessible by a gateway to provide content to multiple mobile devices, in accordance with an embodiment of the present invention.

Turning now to FIG. 4, a flow chart showing a method of selecting content for storage in a multi-device cache that is accessible by a gateway to provide content to multiple mobile devices is shown, in accordance with an embodiment of the present invention. The gateway may be similar to the gateway 106 described previously with reference to FIG. 1. Similarly, the multi-device cache may be similar to the multi-device cache 110 described previously with reference to FIG. 1. The content may be content related to a web page such as videos, pictures, icons, advertisements, as well as the web page itself.

At step 410, a request for content is received at the gateway. The request is sent from a mobile device. As described previously, the gateway may be the interface between a radio access network and a public network such as the Internet. The mobile device may be connected to the Internet through the gateway.

At step 420, the content is determined to not presently be stored in a device-specific cache associated with the mobile device or a multi-device cache associated with multiple mobile devices. The gateway may have access to both device-specific caches and one or more multi-device caches. Having determined that the content is not presently available in a cache, at step 430, a request for the content is communicated to a content server associated with the content. In one embodiment, the request is an HTTP Get request. At step 440, a response is received at the gateway from the content server. The response may include the requested content. At step 450, a copy of the content is stored in the device-specific cache. The device-specific cache is associated with a single mobile device. In one embodiment, the device-specific cache is established when a communication session is initiated for a particular mobile device. The content in the cache, as well as the device-specific cache itself, may be deleted when the communication with the mobile device is terminated. A communication session may be a series of requests sent by the mobile device during a threshold period of time. The communication session may be determined to have terminated after no requests are received after a threshold period of time. The device-specific cache may be stored in the gateway's RAM. The copy of the content may be stored in the device-specific cache, because this is the first time the gateway has received the requested content as evidenced by its absence in any cache communicatively coupled to the gateway.

At step 460, an additional request for the content is received from a different mobile device. The request is received at the gateway. In one embodiment, the additional request is an HTTP Get request. At step 470, the content is determined to not be user-specific because the content was requested by two different mobile devices. When content is requested by multiple user devices, the content is determined not to be tailored to a specific user or device.

At step 480, a copy of the content is stored in the multi-device cache. Storing the content in the multi-device cache allows a single copy of the content to be sent to multiple mobile devices that request the content without retrieving it from the content provider each time the content is requested. In addition, the duplicate storage of the content in multiple device-specific caches is avoided. When a further request for the content is received from yet another mobile device, the content may be retrieved from the multi-device cache and communicated to the further mobile device. In one embodiment, upon determining that the content is not user specific, the content is deleted from the device-specific cache.

Turning now to FIG. 5, a flowchart showing a method of retrieving requested content from a multi-device cache is provided, in accordance with the embodiment of the present invention. At step 510, a request is received at a gateway for a media object. The request is received from a mobile device communicating with the gateway. The gateway is an interface between a radio access network to which the mobile device is connected and a network to which one or more content providers are connected. At step 520, the media object is determined to be presently stored in a multi-device cache. As explained previously, the multi-device cache stores media objects for multiple mobile devices connected to the radio access network. At step 530, the media object is communicated from the gateway to the mobile device that requested it. In one embodiment, the length of time in which the media object is stored in the multi-device cache is not related to the length of time one or more mobile devices are connected to the radio access network. In other words, the content may persist in the multi-device cache after a communication session, browsing session, or connection between the mobile device that requested the content and the access network is terminated. This may be in contrast to the content in a device-specific cache, which may be deleted after a communication session, browsing session, or connection between the mobile device that requested the content and the access network is terminated. The media object may be one or more of a web page, a video, a picture, or an advertisement. Other types of media objects may also be stored in a cache by embodiments of the present invention.

Turning now to FIG. 6, a flowchart showing a method of distributing content between a plurality of device-based caches and a multi-device cache is provided, in accordance to an embodiment of the present invention. At step 610, a request for content is received at a gateway. The gateway is communicatively coupled to a plurality of device-specific caches used to store content associated with specific mobile devices and a multi-device cache that stores generic content that is not user specific. The difference between user-specific content and generic content is that generic content is likely to be requested by multiple mobile devices. User specific content may be tailored to a specific user or infrequently accessed by a small number of users. At step 620, the web page content is determined to be generic because it is requested by at least two different mobile devices communicating with the gateway. In one embodiment, the determination is made when a second request for content previously logged in a content log is received. In another embodiment, web page content in a device-specific cache is identified as identical to the requested content.

At step 630, the web page content is retrieved from the individual device-specific cache in which the content is stored. In one embodiment, the web page content is then deleted from the individual device-specific cache. At step 640, the web page content is stored in a multi-device cache, thereby populating the multi-device cache with generic content that may be utilized by multiple mobile devices.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. Non-transitory computer-readable media having computer-executable instructions embodied thereon that, when executed, perform a method of selecting content for storage in a multi-device cache that is accessible by a gateway to provide content to multiple mobile devices, the method comprising:

receiving, at the gateway, a request for the content, wherein the request is received from a first mobile device;

determining that the content is not presently stored in a device-specific cache associated with the first mobile device and the content is not presently stored in the multi-device cache associated with the multiple mobile devices;

communicating the request for the content to a content server associated with the content;

receiving, at the gateway, a response from the content server that includes the content;

storing a copy of the content in the device-specific cache;

receiving, at the gateway, an additional request for the content from a second mobile device;

determining that the content is not device-specific because the content was requested by two different mobile devices; and storing the copy of the content in the multi-device cache for a threshold period of time before deletion, thereby storing a single copy of the content that can be communicated to the multiple mobile devices that requested the content from the gateway, wherein the multi-device cache is computer memory designated for storing the content received by the gateway in response to requests for the content generated by mobile devices connecting to a content provider through the gateway.

2. The media of claim 1, wherein the method further comprises:

receiving, at the gateway, a further request for the content from a third mobile device;

determining that the content is stored in the multi-device cache;

retrieving the content from the multi-device cache; and communicating the content to the third mobile device.

3. The media of claim 1, wherein the multi-device cache stores content that has been requested by multiple devices.

4. The media of claim 1, wherein the method further comprises:

upon determining that the content is not device specific, deleting the content from the device-specific cache.

5. Non-transitory computer-readable media having computer-executable instructions embodied thereon that, when executed, perform a method of distributing web page content between a plurality of device-based caches and a multi-device cache, the method comprising:

receiving, at a gateway, a request for web page content, wherein the gateway is communicatively coupled to a plurality of device-specific caches used to store content associated with specific mobile devices and the multi-device cache that stores generic content that is not device specific, wherein the multi-device cache is computer memory designated for storing the content received by the gateway in response to requests for the content generated by mobile devices connecting to a content provider through the gateway;

determining that the web page content is generic because it is requested by at least two different mobile devices;

retrieving the web page content from an individual device-specific cache; and storing the web page content in the multi-device cache for a threshold period of time before deletion, thereby populating the multi-device cache with the generic content.

6. The media of claim 5, wherein the web page content remains stored in the multi-device cache after a communication session with a mobile device that initially received the web page content is terminated.

7. The media of claim 5, wherein the method further includes deleting the web page content from the individual device-specific cache.

8. The media of claim 5, wherein the web page content is one or more of an advertisement, a picture, a video, an icon, and a web page.

9. The media of claim 5, wherein the web page content is determined to be generic because a log of media objects received by the gateway indicates that the web page content has been received previously.

10. The media of claim 5, wherein the web page content is determined to be generic because the web page content is currently stored in a cache communicatively coupled to the gateway.

* * * * *